US012425486B2

(12) United States Patent
Karumanchi et al.

(10) Patent No.: US 12,425,486 B2
(45) Date of Patent: Sep. 23, 2025

(54) CALL FORWARDER FOR AIR-GAPPED NETWORKS

(71) Applicant: Microsoft Technology Licensing, LLC, Redmond, WA (US)

(72) Inventors: Narasimha Karumanchi, Hyderabad (IN); Manoj Kumar Ampalam, Suwanee, GA (US); Krupesh Satishkumar Dhruva, Hyderabad (IN); Chandra Mouli Addaguduru, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 18/101,929

(22) Filed: Jan. 26, 2023

(65) Prior Publication Data
US 2024/0259478 A1    Aug. 1, 2024

(51) Int. Cl.
*H04L 67/56*       (2022.01)
*H04L 47/78*       (2022.01)

(52) U.S. Cl.
CPC ............ *H04L 67/56* (2022.05); *H04L 47/782* (2013.01)

(58) Field of Classification Search
CPC ...... H04L 67/56; H04L 67/568; H04L 47/782
See application file for complete search history.

(56) References Cited

U.S. PATENT DOCUMENTS

| | | | | |
|---|---|---|---|---|
| 2017/0005805 A1* | 1/2017 | Wang | ................... | H04L 9/3268 |
| 2020/0412828 A1* | 12/2020 | Zhu | ..................... | H04L 67/1025 |
| 2022/0173886 A1* | 6/2022 | Sardesai | ............ | H04L 63/0428 |

FOREIGN PATENT DOCUMENTS

WO    WO-2023216275 A1 * 11/2023

OTHER PUBLICATIONS

Kevin Saye, "Deep Dive: Creating hierarchies of Azure IoT Edge devices (ISA-95)—Part 2—Kevin Saye", Jul. 20, 2021, URL:https://kevinsaye.wordpress.com/2021/07/20/deep-dive-creating-hierarchies-of-azure-iot-edge-devices-isa-95-part-2/ [retrieved Jan. 29, 2025], pp. 1-18 (Year: 2021).*
International Search Report and Written Opinion received for PCT Application No. PCT/US2024/010612, Apr. 24, 2024, 15 pages.
Kevin Saye, "Deep Dive: Creating hierarchies of Azure IoT Edge devices (ISA-95)—Part 1", Retrieved from https://kevinsaye.wordpress.com/2021/07/15/deep-dive-creating-hierarchies-of-azure-iot-edge-devices-isa-95-part-1/, Jul. 15, 2021, 12 Pages.
Kevin Saye, "Deep Dive: Creating hierarchies of Azure IoT Edge devices (ISA-95)—Part 2", https://kevinsaye.wordpress.com/2021/07/20/deep-dive-creating-hierarchies-of-azure-iot-edge-devices-isa-95-part-2/, Jul. 20, 2021, 24 Pages.

(Continued)

*Primary Examiner* — Jonathan A Bui (74) *Attorney, Agent, or Firm* — Schwegman Lundberg & Woessner, P.A.

(57) ABSTRACT

A computer implemented method includes generating a first call to an external resource by a first resource in a low layer of a multi-layer network of resources, forwarding the first call though successive multiple layers via a call a forwarder in each layer to an edge proxy in each adjacent higher layer, and establishing a connection to the external resource via a top layer having direct external network access without using domain name servers in layers lower than the top layer.

20 Claims, 7 Drawing Sheets

(56) References Cited

OTHER PUBLICATIONS

Kevin Saye, "Deep Dive: Creating hierarchies of Azure IoT Edge devices (ISA-95)—Part 3", Retrieved from https://kevinsaye.wordpress.com/2021/07/21/deep-dive-creating-hierarchies-of-azure-iot-edge-devices-isa-95-part-3/, Jul. 21, 2021, 15 Pages.
International Preliminary Report On Patentability received for PCT Application No. PCT/US2024/010612, mailed on Aug. 7, 2025, 10 pages.

* cited by examiner

CALL FORWARDER FOR AIR-GAPPED NETWORKS

BACKGROUND

Air-gapped networks are used to protect many types of critical systems from hackers or other malicious threat actors. For example, air-gapped networks are used to support the stock market, the military, government agencies and industrial power industries.

In some forms of air-gapped networks, computing resources, such as servers, controllers, and devices of an enterprise system may be grouped into different levels or layers. A standard, ISA-95, has been established that defines each level, what data is obtained or processed at each level, and how data is communicated between levels. Only a top level has direct access to external resources via a network such as the internet. Such external resources may be referred to as external endpoints. Data in a lower level is only sent to a next higher level sequentially until the top level provides a connection to the endpoint to help preserve security of the enterprise system.

Resources in each level making calls to external endpoints utilize a domain name service (DNS) resolver to resolve where to forward traffic, including the calls. Each layer utilizes a DNS resolver to provide connectivity required to forward the call to successive higher levels until the top level sends the call to the correct external endpoint. Implementing a custom DNS resolver at each layer adds overhead and latency, and can increase administrative burdens when adding applications in various levels as well as adding or removing external endpoints that resources in the levels call. Certificate management can also be problematic.

SUMMARY

A computer implemented method includes generating a first call to an external resource by a first resource in a low layer of a multi-layer network of resources, forwarding the first call though successive multiple layers via a call a forwarder in each layer to an edge proxy in each adjacent higher layer, and establishing a connection to the external resource via a top layer having direct external network access without using domain name servers in layers lower than the top layer.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Resources in air-gapped networks may need to call external services, such as external endpoints in cloud-based services. Since the resources do not have direct access to the external endpoints, they must pass traffic, including the calls to a resource in the air-gapped network that can directly access the external endpoints. Domain name service (DNS) resolvers have been used to resolve where to forward traffic, including the calls. However, such DNS resolvers need to be utilized for each resource in the air-gapped network and can involve significant overhead and delay in execution.

The present inventive subject matter utilizes a call forwarder in each cluster or set of clusters of the air-gapped network to forward traffic to resources in other clusters or sets of clusters. The use of the call forward obviates the need for DNS resolvers and can also be used by all resources in a set of clusters of the air-gapped network.

In one example, each cluster or set of clusters of the air-gapped network includes an edge proxy for coordinating access to the cloud-based services. The call forwarders forward the traffic directly to an edge proxy in one of the other clusters or set of clusters sequentially to obtain access to the external endpoints.

In one example, the air-gapped network is designed in accordance with an ISA-95 architecture where resources in the air-gapped network are arranged in multiple levels having different functions. Lower levels may be used to collect data via sensors, with higher levels designated for processing the data and providing control functions, such as industrial process control. Higher levels perform operation and control functions, which a highest level providing direct access to external endpoints via a network, such as the Internet. Each level can only transfer traffic to adjacent levels. This restriction to sequential level transfer provides additional security to protect the air-gapped network from malicious attacks. The resources in one or more of the levels may be Kubernetes clusters (an open-source system for automating deployment, scaling, and management of containerized applications) or servers in one example, which are basically a set of resources that are mission specific.

External endpoints can help with machine learning type functions related to the various missions as well as provide other services. Microsoft Azure cloud services is one example of cloud resources that can provide such services. Cloud services can also provide lifecycle management of the resources.

A core network principle to be addressed in air-gapped networks is traffic inspection. TLS (Transport Layer Security) sessions between endpoints are required for network inspection. As a result, using certificates for each of those endpoints is required. The need for TLS sessions and corresponding network inspection is a more common scenario in ISA-95 (International Society for Automation) network models, where downstream network layers in manufacturing industries do not have direct internet access. Internet access will be available only to the top layer.

To perform TLS terminations at each of the layers, a network layer 7 proxy is used to establish a TLS connection with downstream and upstream layers to inspect all network traffic. Each edge proxy has an endpoint and a list of certificates to present in order to establish such connections. If downstream resources, such as clusters in lower layers require new domain endpoints, upstream edge proxies may be unable to match signatures of certificates and connection requests fail. Manually configuring certificates in each of the layers can be very time consuming and error prone.

An improved method of handling certificates includes using a secret discovery service as a subservice of the edge proxies in each layer in order to receive lists of endpoints and generating self-signed dummy certificates for use of the edge proxies. The dummy certificates are used to quickly and efficiently establish and terminate TLS connections between adjacent layers.

Figure 1:
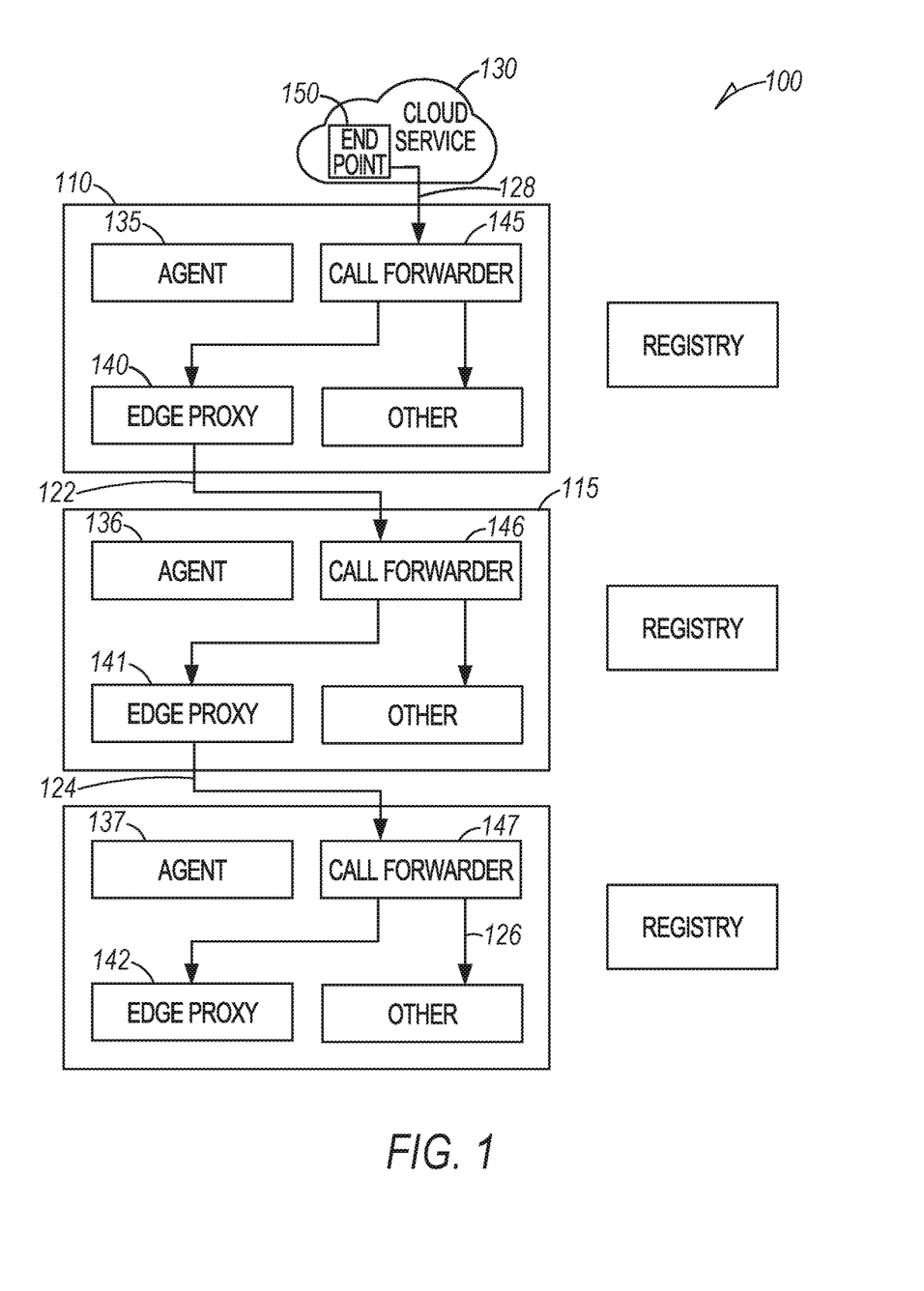
FIG. 1 is a block diagram of a network 100 that includes multiple clusters of resources that communicate with each other via connections according to an example embodiment.

FIG. 1 is a block diagram of a network 100 that includes multiple clusters 110, 115, and 120 of resources that communicate with each other via connections 122, 124, and 126. Each of the clusters 110, 115, and 120 may include one or more clusters of resources. The clusters 110, 115, and 120 may also be thought of as layers or levels of a network architecture.

In one example, cluster 110 is the only cluster that has a direct network connection 128 to external resources, referred to as cloud service 130. Resources in the other clusters do not have a direct connection to external resources, but instead connect through one or more clusters to cluster 110, also referred to as a top-level cluster.

Cloud services 130 may provide many services to resources in the multiple clusters in one example, such as management services to manage the resources and other services that may be called by individual resources within the clusters. Each resource within the clusters may include an agent 135, as shown in cluster 110 and in clusters 115 and 120 at 136 and 137, to facilitate the provision of management services. In one example, agents 135, 136, and 137 are used facilitate resource management services from cloud services 130. Cloud service 130 may comprise Microsoft Azure cloud services along with the agents being Arc agents. Only one agent is shown in each cluster for simplicity of illustration.

Clusters 110 and 115 also include an edge proxy indicated at 140, 141, and 142. Edge proxies 140, 141, and 142 perform transport layer security (TLS) termination to terminate connections between clusters. Edge proxies 140, 141, and 142 operate in parallel with the agents 135, 136, and 137 and offload the TLS termination function from the agents. To avoid the need for DNS resolvers for each resource in each cluster, each cluster includes a call forwarder 145, 146, and 147. The edge proxies 140, 141, and 142 also establish new connections to other clusters.

The cloud service 130 may include information identifying a status of each of the edge proxies, such as a current version and whether or not the proxy is active. The edge proxies may be used in any type of network without internet activity to provide TLS terminations. Such terminations can be helpful for networks with a significant number of defined network policies.

Each edge proxy will have an endpoint as well as a list of certificates (probably with SAN (subject alternate names) and wildcards). In order to establish an appropriate TLS connection with the downstream clusters, the edge proxy must present a valid certificate for the hostname requested by the downstream cluster. When a call comes in from a downstream edge proxy (client), the upstream edge proxy shows its certificate to validate its identity. After a handshake, each subsequent message is terminated at the edge proxy and a new TLS connection is established with the next layer edge proxy. As long as the edge proxy has a list of all domains/endpoints with which the downstream edge proxy must communicate as part of its certificates (either matching with CN (Common Name) or matching with SAN), this works well.

The edge proxy acts as both the server and the client while decoding traffic from both sides. If the downstream clusters (via extension deployment) require a new domain/endpoint to be whitelisted, the upstream edge proxy is unable to match the domain and the connection requests fail.

Resources within clusters may need to be added to network 100. Such resources may also need to be onboarded for resource management by cloud service 130. In order to onboard resources, the resources or agents associated with the resources may need to communication with various external endpoints, such as endpoints within cloud service 130.

Agents within the resource used to onboard resources within the clusters may need to communicate with external endpoints to establish the connection between the on-premises resources and cloud service 130. Because none of these agents have direct access to external endpoints and can only communicate with the edge proxy, the agents must be instructed on how to forward calls to the edge proxy.

A simple solution would be to add custom DNS resolvers. As long as the endpoints are constant, the use of DNS resolvers works well, However, in real time scenarios, it is very common to include applications in the resources that may require access to external endpoints. The inclusion of such applications results in updates for the DNS resolvers to forward requests from new endpoints to the edge proxy, which ca be time consuming if the list of such applications is lengthy.

An improved solution utilizes a call forwarder 145, 146, and 147 in each cluster. Each edge proxy is included within an agentry of agents 135, 136, and 137 and performs TLS termination functions. If such termination is not required, the edge proxies will form a transaction control protocol (TCP) tunnel to establish the connection between clusters all the way to an external endpoint, such as via cloud service 130 data plane services.

The call forwarders 145, 146, and 147 are used as a forward proxies for calls and forward the calls to a next hop. The next hop in one example is a next adjacent cluster edge proxy if one is configured. The call may be routed to the top level, cluster 110, which uses call forwarder 145 to connect to an endpoint 150 in cloud service 130.

If the edge proxy receives a call from downstream, it uses the Call Forwarder, which remains within the cluster, to communicate with the next upstream edge proxy, as shown in the image. As a result, the agents within the resources do not require any custom DNS resolvers to determine a next hop for forwarding the calls.

In one example, the call forwarders may be implemented as a very lightweight custom code that forwards calls from agents and edge proxies to a next edge proxy or directly to the external endpoints (for the top level cluster 110, which has line of sight to the cloud service 130 such as via the Internet).

With the help of the call forwarders, the need for DNS resolvers is eliminated. Configuration for use of the call forwarders can be provided during a bootstrap of network 100.

Because the call forwarders only handle necessary cloud service resource management traffic, it can be very lightweight while at the same time eliminating the need for DNS resolvers. As a result, the product has an advantage in terms of overall latency as well as robustness.

At any of the clusters, the devices to be onboarded can be Kubernetes (K8s) clusters or servers. The very downstream cluster (or server) can be onboarded with servers or k8s clusters on upstream layers.

In one example, the clusters may include multiple clusters in each of multiple levels. The levels may be ISA/95 layers in which only adjacent layers may communicate with each other.

Onboarding of new resources in the clusters or layers may utilize the edge proxies. An edge proxy at a next upstream layer may be used to onboard additional downstream layer devices. As a result, enabling the edge proxy will be a prerequisite for onboarding the downstream layer devices.

A cloud service 130 resource management representation for each of the edge proxy on-premises instances may be maintained. The representation includes a list of endpoints that can be controlled with resource management gestures. In one example, the representation may be an Azure Resource Management (ARM) representation. An instance of an ARM edge proxy resource is created by doing a PUT on ACRP/EdgeProxies/layer35proxy.

Once the edge proxy is operational, it will subscribe to a data plane service of the cloud service 130 to receive updates about the list of endpoints from an azure edge proxy instance.

The necessary endpoints for bootstrapping new resources will be pre-loaded into the Azure Edge Proxy instances (for example, management.azure.com).

In a further example, one or more container registries may be maintained to include a history of shared information for a set of layers. A separate local container registry may be used for each layer.

Figure 2:
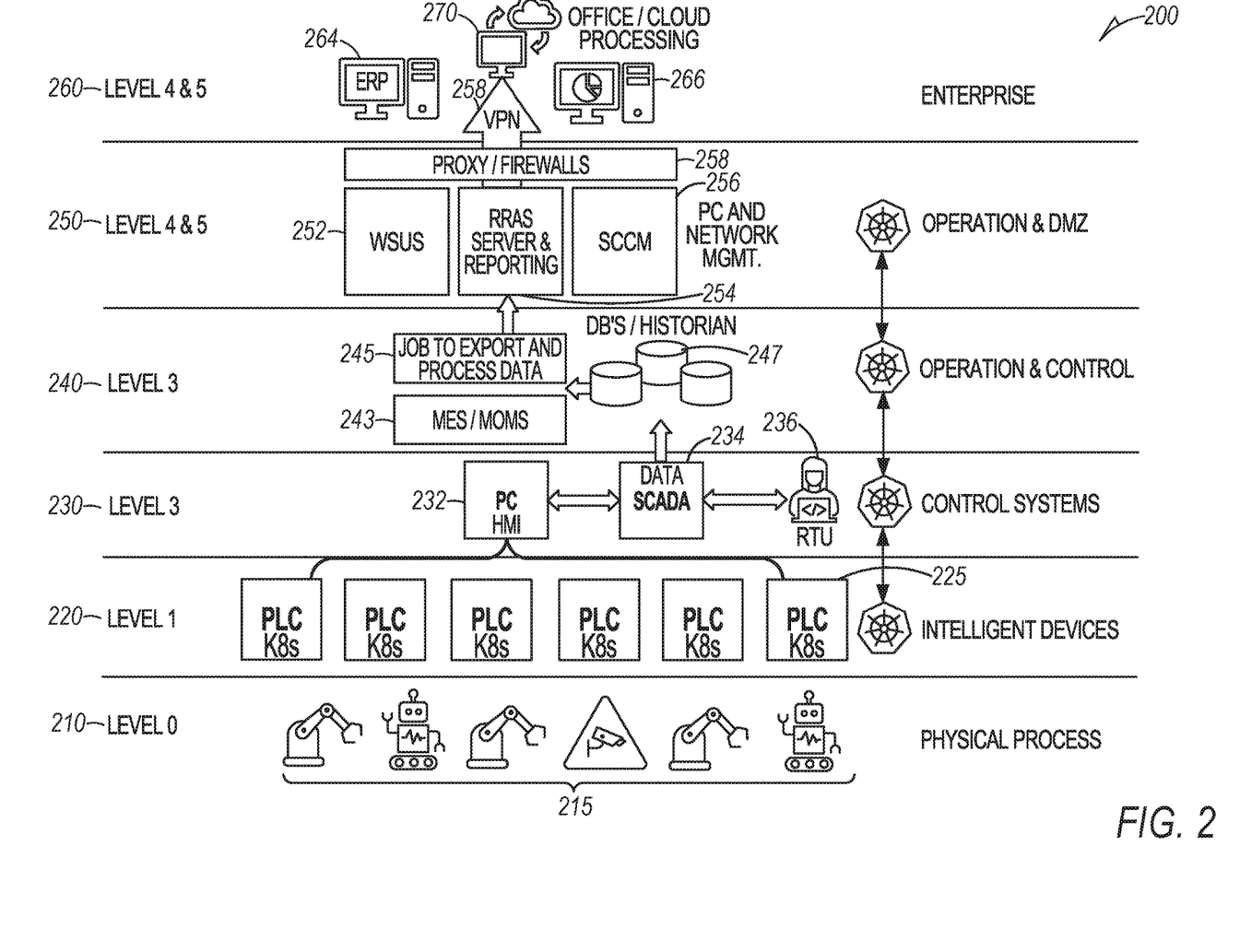
FIG. 2 is a block diagram of an air-gapped network architecture that illustrates five different levels of automation where data is created, consumed, or transacted in a manufacturing environment according to an example embodiment.

FIG. 2 is a block diagram of an air-gapped network architecture 200 that illustrates five different levels of automation where data is created, consumed, or transacted in a manufacturing environment. In one example, a data model for the architecture 200 is based on UML (unified modelling language) that is already in use for data interchange between MOM (manufacturing operations management) and ERP (enterprise resource planning) systems.

A level 210 is where data creation begins and represents an actual production or manufacturing process. Level 210 will include a call forwarder to provide data to an adjacent level, level 220.

Level 220 includes resources like sensors and intelligent equipment that create or gather data in a real world industrial process control environment or manufacturing process. One example resource is a programmable logic controller (PLC) 225, of which there may be several. The sensors may include internet of things sensors in various contexts, such as in an industrial automation, manufacturing, industrial processes, and other real-world processes. This data and intelligence are further used to manipulate line equipment and devices used in the processes.

A level 230 includes resources that use information collected from lower level 220 to drive actions that impact the equipment and process performance. Controls and automation hardware and software come together to monitor and control physical processes. Example resources include a personal computer (PC) to provide a human machine interface (HMI) 232. A supervisory control and data acquisition system (SCADA) 234 is used to collect data from the level 220 resources. A remote terminal unit (RTU) 236 may also be provided.

A level 240 includes resources that perform workflows to deliver the goals of the process, such as a production line, or industrial process. Workflows involve actions like scheduling, workload balancing, optimization of production and other processes that help achieve the manufacturing objectives. MOM systems like MES (manufacturing execution systems), production scheduling systems and historians are also performed by resources in level 240.

Level 250 includes resources for network management and operations. Example resources include Window Server/Software Update services (WSUS) 252, Routing and remote access service (RRAS) 254, and system management configuration manager (SCCM) 256 for personal computer and network management services. Level 250 also includes a network security functions such as proxy and firewalls 258 and a virtual private network (VPN) 262 to connect to external resources such as cloud services 270.

Level 260 consists of enterprise systems that administer the manufacturing operations in line with the business goals. Example resources include ERP (enterprise resource planning) 264 and CRM (customer relationship management) and SCM (supply chain management) indicated at 266. These resources are just some of the enterprise systems that use data from lower levels to drive business decisions.

Cloud services 270 include the external endpoints that provide services to one or more resources in the various levels. The lower levels do not have direct access to such external endpoints, but instead make calls through successive upper levels and finally via VPN 262 using the edge proxies and call forwarders described above. This manner of making calls isolates the lower levels from malicious access attempts and relieves each level of having to implement DNS resolvers for each resource in each level. Provisioning and management of resources in the lower levels is significantly simplified.

The different layers are defined in such a way that it is independent of the industry or product manufactured. It can apply to any type of manufacturing like discrete, process or hybrid.

Level 260 is the top level that provides a connection 262 to external endpoints in cloud services 270. Level 260 may include enterprise services, such as ERP 264 and other enterprise services.

In one example, architecture 200 may be an ISA-95 architecture where only the upper most layer has a line of sight to internet (azure) and none of the lower layers will have a direct internet connection. The lower layers cannot have a tunnel through their next layers (parents) to communicate through the layers and reach internet. The upper layers in the stack can allow only a limited set of ports (say ports 443 and 80) for the use by below layers. We can assume port 443 for all secure communication. Current IoT edge devices use port 8883 for MQTT and port 443 for the rest of the communications.

In one example cloud services 270 may be a Microsoft Azure service. Azure arc already supports connecting hybrid infrastructure resources and their management. But it expects line of sight to Azure with the resources. Lower levels traverse sequentially through all the different network layers to get to services 270. While traversing between layers 1-3.5, the following principles should be maintained: network isolation, ability to audit traffic, ability to control, and enforcing network limitations.

Figure 3:
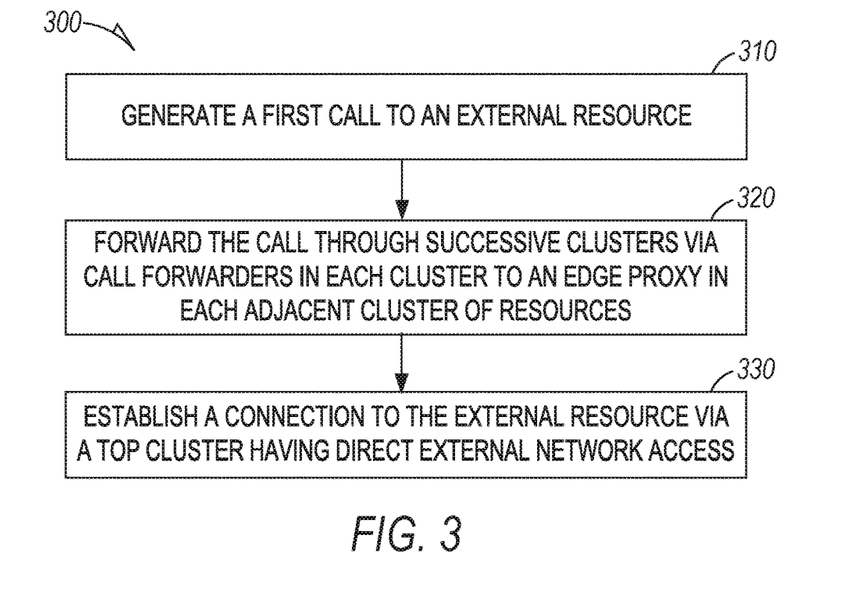
FIG. 3 is a flowchart illustrating a computer implemented method of establishing connections between internal resources without direct external network connections to external resources according to an example embodiment.

FIG. 3 is a flowchart illustrating a computer implemented method 300 of establishing connections between internal resources without direct external network connections to external resources. Method 300 begins at operation 310 by generating a first call to an external resource by a first resource in a cluster of a multi-cluster network of resources. The first cluster may reside in a low layer of an air-gapped network. The first call is forwarded at operation 320 though successive clusters via call forwarders in each cluster to an edge proxy in each adjacent cluster of resources. A connection is established to the external resource at operation 330 via a top cluster having direct external network access without using domain name servers in layers lower than the top layer.

Figure 4:
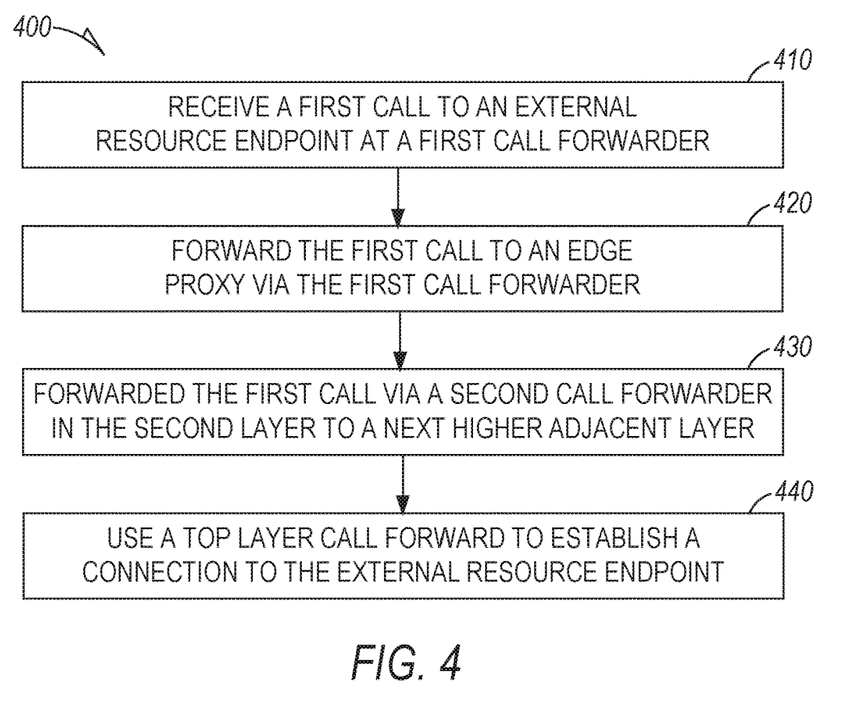
FIG. 4 is a flowchart illustrating an alternative computer implemented method of establishing connections between internal resources without direct external network connections to external resources according to an example embodiment.

FIG. 4 is a flowchart illustrating an alternative computer implemented method 400 of establishing connections between internal resources without direct external network connections to external resources. Method 400 begins at operation 410 by receiving a first call to an external resource endpoint at a first call forwarder in a first layer of a multi-layer system of clusters of resources. Method 400 continues at operation 420 by forwarding the first call to an edge proxy via the first call forwarder in a second layer higher than and adjacent to the first layer. The first call is forwarded via a second call forwarder in the second layer at operation 430 to a next higher adjacent layer.

The call forwarder is used as a forward proxy. One call forwarder per layer may be used to establish a connection to the external resource endpoint. At operation 440, a top layer call forwarder establishes a connection to the external resource endpoint.

In one example, the connection to the external resource endpoint is established without using domain name server resolvers. The series of connections between clusters and the external resource endpoint forms a transaction control protocol (TCP) tunnel between the external endpoint and an endpoint of an internal resource in the first layer. Resources in a layer may include Kubernetes clusters or servers that are directed toward a specific mission. Access to cloud resources may support that mission.

In one example, the connection may be used to onboard and manage resources within the clusters. Resources in a lowest layer of clusters may include Internet of things (IOT) devices such as sensors used to collect data.

Resources in intermediate layers comprise intelligent devices/control systems/operations and control. Operations, and enterprise services are in a top layer which has a direct external network connection.

In one example, each edge proxy operates to establish a TLS connection with the downstream and a TLS connection with the upstream to inspect all traffic. Each edge proxy will have an endpoint as well as a list of certificates, with SAN (subject alternate names) and wildcards. To establish an appropriate TLS connection with a downstream resource, the edge proxy must present a valid certificate for the hostname requested by the downstream edge proxy. When a call comes in from a downstream layer edge proxy (client), the upstream edge proxy shows its certificate to validate its identity. After the handshake, each subsequent message is terminated at the edge proxy and a new TLS connection is established with the next layer edge proxy. As long as the edge proxy has a list of all domains/endpoints with which the downstream edge proxy must communicate as part of its certificates (either matching with CN (Common Name) or matching with SAN), this works well.

If the downstream clusters (via extension deployment) require a new domain/endpoint to be whitelisted, the upstream edge proxies are unable to match the domain and the connection requests fail.

One of the core network principles that must be addressed in air-gapped networks is traffic inspection. TLS (Transport Layer Security) sessions between endpoints are required for network inspection. As a result, using certificates for each of those endpoints is also required.

The edge proxy acts as both the server and the client while decoding traffic from both sides. The tricky part is that a certificate authority (CA) system is intended to prevent precisely this type of attack by allowing a trusted third party to cryptographically sign a server's certificates in order to validate their legitimacy.

A secure client will simply drop the connection and refuse to proceed if this signature does not match or is from an untrusted party. Regardless of the many flaws in the CA system as it currently exists, this is usually fatal to attempts to edge proxy a TLS connection for analysis. The exposure can be mitigated by using a trusted CA.

Some industry solutions require manual intervention to whitelist and configure the domains for each of the endpoints. There are also tools like lets-encrypt and cert-manager that can automatically renew certificates for a given endpoint.

An improved method of handing certificates includes automatically identifying endpoints from metadata of applications to be deployed on different layers in an air-gapped network. The improved method automates the process of managing certificates without requiring any manual intervention from the customer. This is useful in large scale, production systems that require a variety of endpoints.

Resources, such as devices, to be onboarded at any of the layers can be Kubernetes (K8s) clusters or servers. A downstream cluster (or server) can be onboarded with servers or k8s clusters on upstream layers.

The devices' onboarding for cloud-based management will begin at the top layer and progress downward. The top layer devices can be onboarded with or without the edge proxy. The edge proxy cannot be enabled if the top layer device (either the k8s cluster or the server) is not onboarded. The edge proxy can be enabled as a post action once the device has been arc onboarded.

Once the resource for an edge proxy is created, an extension manager may be used to pull the necessary information from a config agent and edge proxy pod/process is launched on the device. The edge proxy is then configured to create certificates.

Each edge proxy instance that gets created will have the default list of endpoints to be allowed. A set of custom resource definitions (CRDs) is defined (by extension operator or manager) for the referenced endpoints at the time of edge proxy resource creation. When an edge proxy detects the CRDs/CRs, it begins the certificate bootstrapping process. The extension manager will make a control plane call to get the endpoints through a data plane server while bootstrapping the edge proxy.

Figure 5:
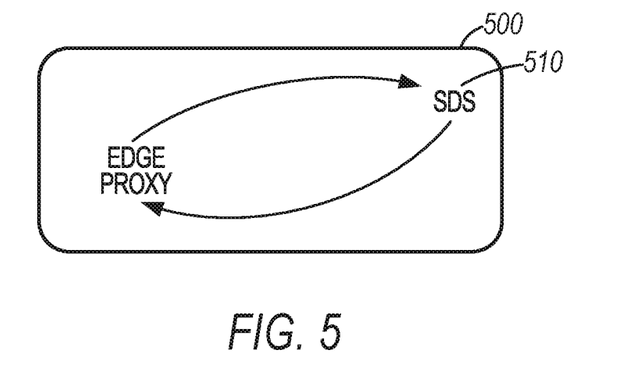
FIG. 5 is a block diagram of an edge proxy that includes a secret discover service (SDS) according to an example embodiment.

FIG. 5 is a block diagram of an edge proxy 500 that includes a secret discover service (SDS) 510. The edge proxy 500 will use the SDS in the form of a sub-service to generate dummy self-signed certificates for each of those endpoints during the bootstrapping process. The use of such dummy self-signed certificates does not increase security risks, as the network is air-gapped and only adjacent layers are allowed to transfer data traffic between each other.

The edge proxy suspends a command line interface (CLI) client (installation) and connects to the specialized SDS 510 to generate the dummy TLS certificates. The edge proxy then returns to the CLI client and completes the remaining post-installation steps.

Once the initial configuration is complete, extensions (applications) can be enabled at any of the downstream layers. The immediate question that may arise is. "How do the upstream layers obtain the required certificates?"

Upstream layers may obtain the required certificates by maintaining the relationship between the edge proxies. Parent-child relationships may be established between these edge proxies during the onboarding process.

Each extension will keep metadata (for example, a list of endpoints that an extension requires) in a location accessible to the cloud service control plane, also represented at 128 in FIG. 1.

To enable an extension at a lower layer, an extension manager will make a call to the cloud service 130 to obtain the list of external endpoints required by the extension. As a result, the external endpoints will be routed through the data plane service, which is monitored by the extension manager. In parallel, the cloud service 130 control plane will send the same data to the extension managers of all upstream layers. The list of edge proxies will be retrieved from the relationships stored on the cloud service 130. The extension managers of those layers consume data from the data plane service and generate custom resources. Following that, when the respective layers' SDS 510 detects those custom resources, it generates dummy certificates for each of those endpoints.

Figure 6:
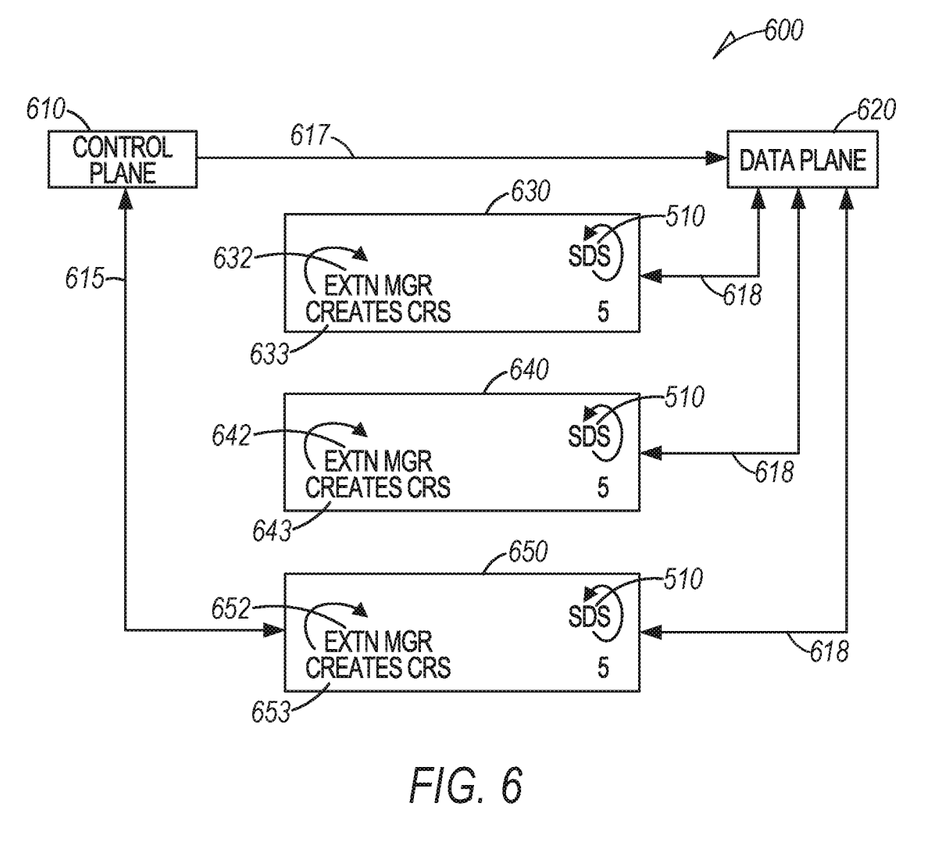
FIG. 6 is a workflow diagram illustrating a workflow for generating signed certificates according to an example embodiment.

FIG. 6 is a workflow diagram illustrating a workflow 600 for generating signed certificates. The SDSs 510 at each layer 630, 640, 650 are part of extension managers 632, 642, and 652 and will generate on-the-fly interception certificates 633, 643, 653 signed by the root CA. The level on which the extension is enabled will make a control plane 610 call to obtain the list of endpoints to be whitelisted.

The control plane 610 will retrieve the required metadata at 617 for that extension from a previously published location and send it to the clusters that require it (for example, all upstream layers of the current level) via a data plane 620 service. The control plane 610 maintains relationships between clusters in order to pull that dependency graph. Obtaining the endpoints is illustrated at 615.

The SDS 510 may include or serve as a watcher on the data plane service to pull the metadata 618. After reviewing the metadata, the extension managers will create CRDs/CRs for each of the endpoints.

The SDSs of those respective layers will have a watcher on those CRDs and start creating dummy certificates for those endpoints. This establishes the trust between all the edge proxies.

The edge proxy configuration can be updated in the same way that it was created and installed. A simple map that contains a list of certificates generated by the edge proxy can be used to improve update flow.

The update flow will examine the current list of endpoints and perform create read update delete (CRUD) on the delta. The update flow for upstream clusters is the same as discussed above for creating CRDs/CRs for each of the endpoints. After updating the current level edge proxy, the local SDS will request an update from the upstream SDS. This process will be repeated until the top layer is reached.

In one example, the extension manager may be used to automate the flow for installation of extensions and certificate/configuration management for new endpoints.

Figure 7:
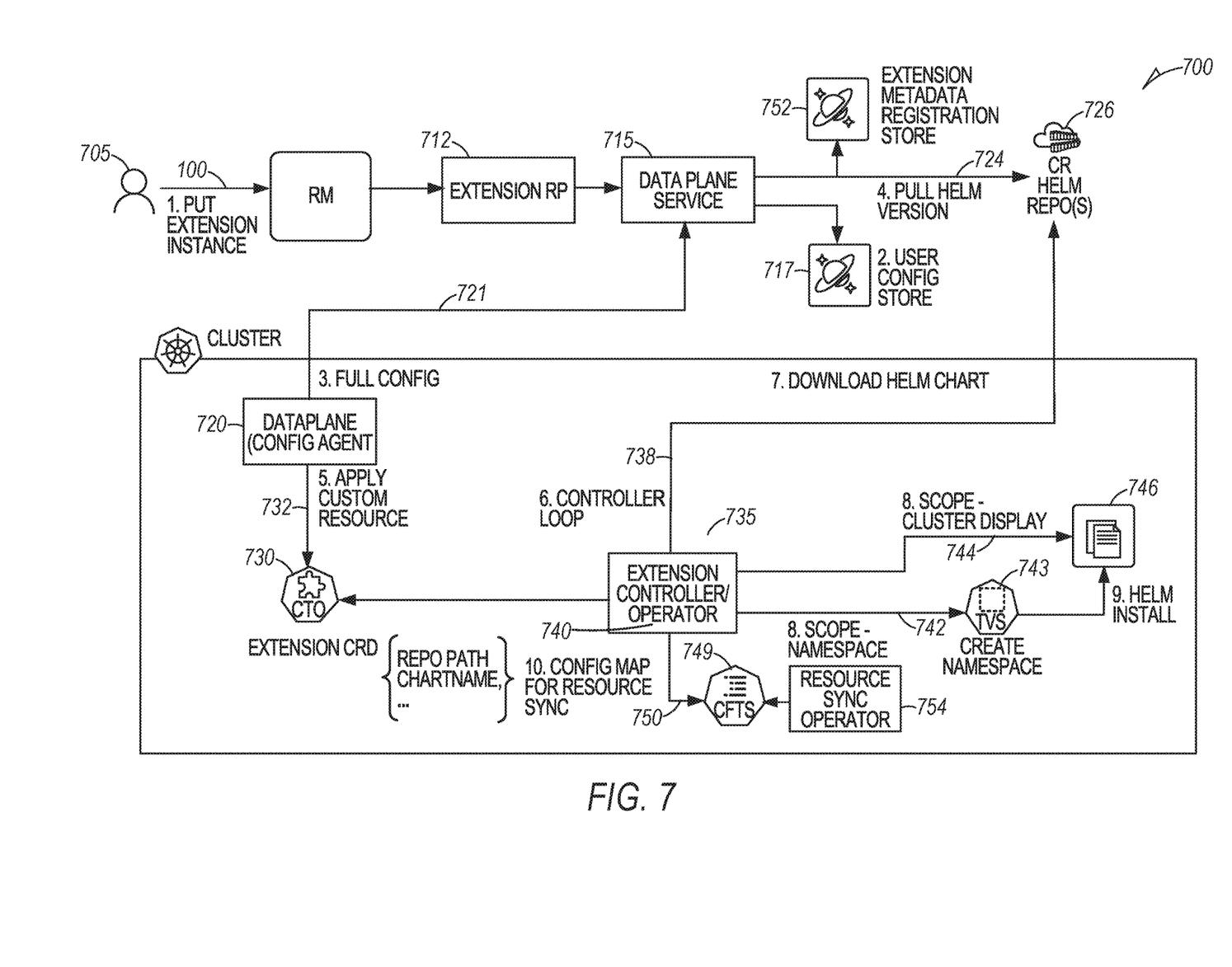
FIG. 7 is a flow diagram illustrating a method of automating installation of extensions according to an example embodiment.

FIG. 7 is a flow diagram illustrating a method 700 of automating installation of extensions. Flow prior to automating installation is first described. At operation 710, a user 705 does a Put to create an instance of registered extensions 712. The instance configuration is stored by a configuration data plane service 715 in a user configuration store 717. Cloud service data plane agent 720 pulls at operation 721 the extension config from the configuration data plane service 715. As part of the request, the latest helm chart (a collection of files that describe a related set of Kubernetes resources) version is also pulled at 724 from a configuration registry (CR) 726.

The data plane agent 720 creates extension CRD (Custom Resource Definition) 730 at operation 732. An extension controller 735 reconciles loops at operation 738 and responds to a resource creating request.

Extension manager/operator 740 downloads the helm chart from CR 726. It is determined if the operator is at a namespace scope 742 and creates a namespace at 743, or if at a cluster scope 744. The helm chart is then installed at 746.

In case of cloud service 130 being an Azure cloud with ArcZone extensions, a configmap 749 is created at 750 with resourceType=>CRD mapping info given during extension registration in ResourceSync namespace (azure-arc). Arc ResourceSync operator uses this mapping to push resources to Azure.

To fix the dynamic configuration (certificate/endpoint) management for the extensions, the following changes may be made for the extension install flow.

Each extension publishes the metadata in an extension metadata registration store 752 as a list of endpoints, the store 752 is accessible to the control plane 610.

The user 705 does the Put operation 710 to create an instance of registered extensions 712. A instance configuration is stored in configuration data plane service 715 configuration store 717.

Data plane agent 720 pulls the extension config from Configuration data plane service 715. As part of this request, the latest helm chart version is also pulled from CR 726. The data plane agent 720 creates extension CRD 730.

Extension controller 735 has a reconcile loop to respond to the resource creating request. The extension metadata from store 752 will include a list of whitelisted endpoints. This metadata will be made available to the cloud service control plane. The extension operator 740 will make a control plane call to obtain the list of endpoints during extension enablement. As a response, it will either return the list of endpoints or send the data to the extension manager-monitored data plane service. When the extension manager receives data from the data plane service, it generates a CRD for each of these endpoints.

Because a dependency graph between the edge proxies is maintained, when the extension manager requests a list of endpoints, ARM will send the same data to all layers that require those endpoints at the same time. This means that all upstream layers will receive data from the data plane service. CRDs will be created in parallel by the extension managers of those layers.

As described above, the local SDS 510 will be invoked to create a dummy certificate for each of those referred endpoints. The local SDS 510 will be watching the CRDs (Custom Resource Definitions).

The created certificates are appended to the edge proxy so that the endpoints will be whitelisted to talk to the next layer edge proxy. This establishes the trust between the edge proxies once the needed certificates are created for that extension.

Extension manager/operator 735/740 downloads the helm chart from ACR and determines whether the operator is at namespace scope or cluster scope, and then installs helm chart.

In case of ArcZone extensions, configmap 749 is created with resourceType=>CRD mapping info given during extension registration in ResourceSync namespace (azure-arc). Arc ResourceSync operator 754 uses this mapping to push resources to Azure.

The SDS 510 will take care of renewing certificates and can leverage the existing opensource projects such as lets-encrypt and cert-manager. If TLS terminations are not required, tunnelling protocols may be used to forward the requests.

The root CA may be shared and is the same for all the edge proxies.

Few scenarios (with restricted network policies) do not allow us to use certificates with wildcards that are applied to a domain and associated subdomains. In this case, a specific certificate may be generated for each of the endpoint dynamically.

The endpoints/extn can be dumped to a local gitstore but the config still comes from extns metadata.

Figure 8:
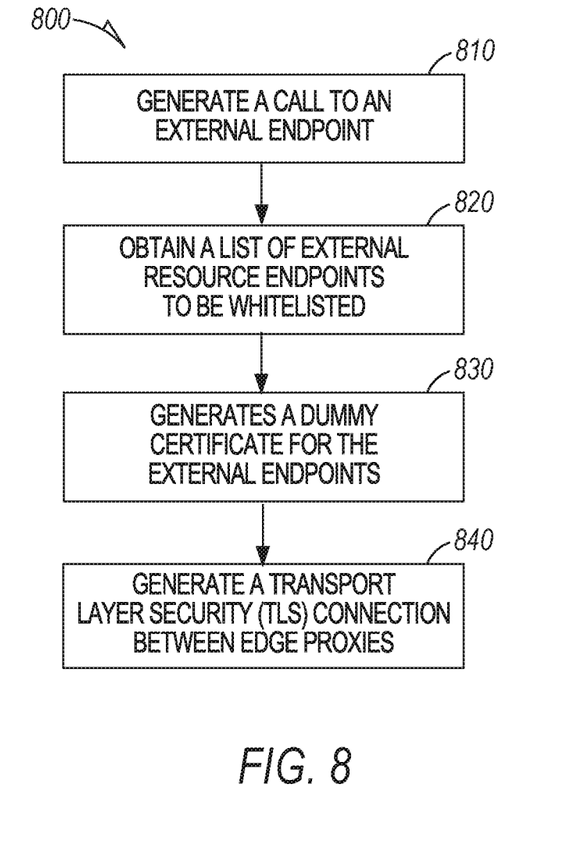
FIG. 8 is a flowchart illustrating a computer implemented method of generating dummy certificates during edge proxy installation according to an example embodiment.

FIG. 8 is a flowchart illustrating a computer implemented method 800 of generating dummy certificates during edge proxy installation. Method 800 begins at operation 810 by generating a call to an external endpoint from a resource in a first layer of a multi-layer network of resources. In one example, the air-gapped network comprises a multi-layer network of clusters of resources wherein data passes only through adjacent layers. The air-gapped network may be an ISA/95 compliant network. In one example, the call is for an extension that comprises an application or new device to add to the air-gapped network Operation 820 obtains metadata that includes a list of external resource endpoints to be whitelisted. The metadata may be obtained by a watcher of an edge proxy in each layer, via a data plane service. Each edge proxy generates a dummy certificate for the external endpoints at operation 830 to create trust between edge proxies at adjacent layers in the air-gapped network.

Method 800 may proceed at operation 840 by generating a transport layer security (TLS) connection between edge proxies of the air-gapped network using the dummy certificate. The TLS connection enables traffic inspection.

In one example, method 800 continues by decoding traffic from adjacent resources using the dummy certificates via the edge proxy acting as server and client. The dummy certificates may be self-signed certificates, such as transport layer service (TLS) certificates.

The watcher at each layer may be a secret discovery service that is a subservice of the edge proxy. The metadata may be provided to the edge proxies based on an established parent-child relationships between edge proxies in adjacent layers. The use of the dummy certificates at each adjacent layer in succession enables fast and efficient communications between the resource in the first layer to the external endpoint. The data plane service may utilize the data plane of a cloud service that manages resources in the layers of the multi-layer network.

Figure 9:
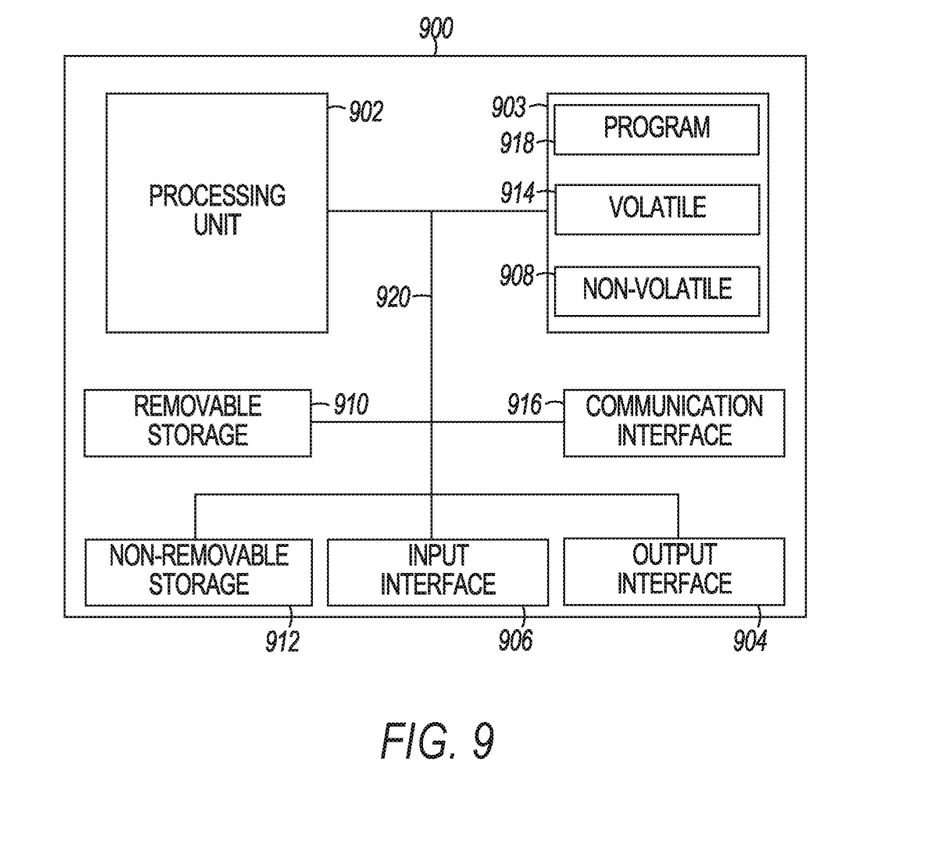
FIG. 9 is a block schematic diagram of a computer system to implement one or more example embodiments.

FIG. 9 is a block schematic diagram of a computer system 900 to use a call forwarder for communications between clusters of resources, to generate dummy certificates for communication between resources to reach external endpoints, and for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

EXAMPLES

1. A computer implemented method includes generating a first call to an external resource by a first resource in a low layer of a multi-layer network of resources, forwarding the first call though successive multiple layers via a call a forwarder in each layer to an edge proxy in each adjacent higher layer, and establishing a connection to the external resource via a top layer having direct external network access without using domain name servers in layers lower than the top layer.
2. The method of example 1 wherein the edge proxies coordinate access to cloud based services for management of resources in the multi-layer network of resources.
3. The method of any of examples 1-2 wherein forwarding the first call through successive multiple layers via edge proxies and call forwarders includes forming a transaction control protocol (TCP) tunnel.
4. The method of any of examples 1-3 wherein the call forwarders operate as forwarding proxies.
5. The method of any of examples 1-4 wherein the call forwarder in a layer forwards calls from multiple different resources in the layer.
6. The method of any of examples 1-5 wherein a lowest layer includes Internet of things devices that collect data and transfer the data to a next higher layer.
7. The method of any of examples 1-6 wherein at least one layer comprises intelligent devices and control systems.
8 The method of any of examples 1-7 wherein a top layer is the only layer that has direct external network access.
9. The method of any of examples 1-8 wherein at least one layer comprises a Kubernetes cluster.
10. A computer implemented method includes receiving a first call to an external resource at a first call forwarder in a first layer of a multi-layer network of resources, forwarding the first call to an edge proxy via the first call forwarder in a second layer higher than and adjacent to the first layer, and forwarding the first call via a second call forwarder in the second layer to a next higher adjacent layer.
11. The method of example 10 and further including establishing a connection to the external resource via the second call forwarder having direct external network access without using domain name servers in layers lower than the second layer.
12. The method of any of examples 10-12 wherein the next higher adjacent layer receives the call at a next higher adjacent layer edge proxy.
13. The method of any of examples 10-12 wherein forwarding the first call through edge proxies and call forwarders includes forming a transaction control protocol (TCP) tunnel.
14. The method of any of examples 10-13 wherein the first call forwarder forwards calls from multiple different resources in the first layer.
15. The method of any of examples 10-14 wherein first layer includes Internet of things devices that collect data and transfer the data to the next higher adjacent layer.
16. The method of any of examples 10-15 wherein at least one layer comprises a Kubernetes cluster.
17. A machine-readable storage device has instructions for execution by a processor of a machine to cause the processor to perform operations to perform any of the methods of examples 1-16.
18. A device includes a processor and a memory device coupled to the processor and having a program stored thereon for execution by the processor to perform operations to perform any of the methods of examples 1-16.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system." and the like may refer to computer-related entities, hardware, and software in execution, firmware, or combination thereof. A component may be a process running on a processor, an object, an executable, a program, a function, a subroutine, a computer, or a combination of software and hardware. The term. "processor." may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from the described systems. Other embodiments may be within the scope of the following claims.

The invention claimed is:

1. A computer implemented method comprising:
generating a first call to an external resource by a first resource in a low layer of a multi-layer network of resources;
forwarding the first call though successive multiple layers via a call forwarder in each layer to an edge proxy in each adjacent higher layer forming a transaction control protocol (TCP) tunnel between the first resource and the external resource, wherein each edge proxy has a transport layer security (TLS) connection with each adjacent layer edge proxy using dummy self-signed certificates; and
establishing a connection to the external resource via a top layer having direct external network access without using domain name servers in layers lower than the top layer.

2. The method of claim 1 wherein the edge proxies coordinate access to cloud based services for management of resources in the multi-layer network of resources.

3. The method of claim 1 wherein forwarding the first call through successive multiple layers via edge proxies and call forwarders includes forming a transaction control protocol (TCP) tunnel.

4. The method of claim 1 wherein the call forwarders operate as forward proxies.

5. The method of claim 1 wherein the call forwarder in a layer forwards calls from multiple different resources in the layer.

6. The method of claim 1 wherein a lowest layer comprises Internet of things devices that collect data and transfer the data to a next higher layer.

7. The method of claim 1 wherein at least one layer comprises intelligent devices and control systems.

8. The method of claim 1 wherein the top layer is the only layer that has direct external network access.

9. The method of claim 1 wherein at least one layer comprises a Kubernetes cluster.

10. A computer implemented method comprising:
receiving a first call to an external resource at a first call forwarder in a first layer of a multi-layer network of resources;
forwarding the first call to an edge proxy via the first call forwarder in a second layer higher than and adjacent to the first layer forming a transaction control protocol (TCP) tunnel between the first layer and the external resource; and
forwarding the first call via a second call forwarder in the second layer to an edge proxy in the next higher adjacent layer,
wherein each edge proxy has a transport layer security (TLS) connection with each adjacent layer edge proxy using dummy self-signed certificates.

11. The method of claim 10 and wherein the TCP tunnel is formed by a next higher adjacent layer edge proxy having direct external network access without using domain name servers in layers lower than the second layer.

12. The method of claim 10 wherein the next higher adjacent layer receives the call at a next higher adjacent layer edge proxy.

13. The method of claim 10 wherein forwarding the first call through edge proxies and call forwarders includes forming a transaction control protocol (TCP) tunnel.

14. The method of claim 10 wherein the first call forwarder forwards calls from multiple different resources in the first layer.

15. The method of claim 10 wherein first layer comprises Internet of things devices that collect data and transfer the data to the next higher adjacent layer.

16. The method of claim 10 wherein at least one layer comprises a Kubernetes cluster.

17. A device comprising:
a processor; and
a memory device coupled to the processor and having a program stored thereon for execution by the processor to perform operations comprising:
generating a first call to an external resource by a first resource in a low layer of a multi-layer network of resources;
forwarding the first call though successive multiple layers via a call forwarder in each layer to an edge proxy in each adjacent higher layer forwarding the first call though successive multiple layers via a call forwarder in each layer to an edge proxy in each adjacent higher layer forming a transaction control protocol (TCP) tunnel between the first resource and the external resource, wherein each edge proxy has a transport layer security (TLS) connection with each adjacent layer edge proxy using dummy self-signed certificates; and
establishing a connection to the external resource via a top layer having direct external network access without using domain name servers in layers lower than the top layer.

18. The device of claim 17 wherein the edge proxies coordinate access to cloud based services for management of resources in the multi-layer network of resources.

19. The device of claim 17 wherein the call forwarders operate as forwarding proxies for multiple different resources in the layer and wherein a lowest layer comprises Internet of things devices that collect data and transfer the data to a next higher layer.

20. The device of claim 17 wherein the top layer is the only layer that has direct external network access.

* * * * *